United States Patent
Li et al.

(10) Patent No.: US 9,958,839 B2
(45) Date of Patent: May 1, 2018

(54) PARAMETER TUNING METHOD OF UNKNOWN PID CONTROLLER

(71) Applicant: Industrial Technology Research Institute, Hsinchu (TW)

(72) Inventors: Jyun-Sian Li, Kaohsiung (TW); Yi-Cheng Cheng, Hsinchu (TW); Chen-Kai Hsu, Miaoli County (TW); Chun-Yen Chen, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 251 days.

(21) Appl. No.: 14/963,244

(22) Filed: Dec. 9, 2015

(65) Prior Publication Data

US 2017/0115641 A1 Apr. 27, 2017

(30) Foreign Application Priority Data

Oct. 21, 2015 (TW) .............................. 104134585 A

(51) Int. Cl.
*G05B 13/02* (2006.01)
*G05B 11/36* (2006.01)
(Continued)

(52) U.S. Cl.
CPC ............ *G05B 13/024* (2013.01); *G05B 11/36* (2013.01); *G05B 11/38* (2013.01); *G05B 11/42* (2013.01)

(58) Field of Classification Search
CPC ...... G05B 13/024; G05B 11/36; G05B 11/38; G05B 11/42
See application file for complete search history.

(56) References Cited

U.S. PATENT DOCUMENTS 4,441,151 A * 4/1984 Hayashibe ........... G05B 13/025
318/561
4,549,123 A * 10/1985 Hagglund .......... G05B 23/0202
318/610
(Continued)

FOREIGN PATENT DOCUMENTS

CN 102141776 8/2011
CN 103105774 5/2013
(Continued)

OTHER PUBLICATIONS

Han-Pang Huang, et al., "A Stable On-Line Self-Tuning Optimal PID Controller for a Class of Unknown Systems," Asian Journal of Control, vol. 9, No. 2, Jun. 2007, pp. 151-162.
(Continued)

*Primary Examiner* — Ramesh Patel
(74) *Attorney, Agent, or Firm* — JCIPRNET

(57) ABSTRACT

A parameter tuning method of an unknown proportional-integral-derivative (PID) controller is provided. The unknown PID controller is replaced with the control algorithm of the generic controller to perform the optimal parameter tuning to obtain the target parameter of the generic controller. The unknown PID controller is set with a first parameter group so that the corresponding input signal, the control signal and the output signal are measured for performing the parameter identification procedure of the generic controller to obtain a second parameter group of the generic controller. When the second parameter group is not within a specification range of the target parameter, the first parameter is re-calculated and modified by a direct search method in accordance with the difference between the second parameter group and the target parameter for setting the unknown PID controller again, and then the input signal, the control signal and the output signal are measured again.

14 Claims, 5 Drawing Sheets

(51) Int. Cl.
*G05B 11/38* (2006.01)
*G05B 11/42* (2006.01)

(56) References Cited

U.S. PATENT DOCUMENTS

| | | | |
|---|---|---|---|
| 6,937,908 B2 | 8/2005 | Chang et al. | |
| 7,551,969 B2* | 6/2009 | Wojsznis | G05B 11/42 700/31 |
| 8,200,346 B2* | 6/2012 | Thiele | G05B 17/02 700/44 |
| 8,255,066 B2* | 8/2012 | Boiko | G05B 19/042 318/609 |
| 8,644,962 B2* | 2/2014 | Kelly | G05B 21/02 323/207 |
| 8,706,267 B2* | 4/2014 | Caldwell | G05B 13/048 700/29 |
| 8,805,555 B2 | 8/2014 | Shimizu | |
| 2003/0153990 A1* | 8/2003 | Boiko | G05B 11/42 700/37 |
| 2004/0135534 A1* | 7/2004 | Cullen | G05B 17/02 318/609 |
| 2006/0224255 A1* | 10/2006 | Tanaka | G05B 11/42 700/42 |
| 2009/0204259 A1* | 8/2009 | Danko | G05B 13/024 700/250 |
| 2009/0319060 A1* | 12/2009 | Wojsznis | G05B 11/42 700/30 |
| 2010/0292813 A1* | 11/2010 | Boiko | G05B 19/042 700/37 |
| 2012/0083905 A1 | 4/2012 | Shimizu | |

FOREIGN PATENT DOCUMENTS

| | | |
|---|---|---|
| CN | 103294029 | 9/2013 |
| CN | 103558755 | 2/2014 |
| TW | 201435525 | 9/2014 |
| TW | 201532379 | 8/2015 |
| WO | 2013128214 | 9/2013 |

OTHER PUBLICATIONS

Toru Yamamoto, et al., "A Design Method of Self-Tuning PID Controllers," Proceedings of the American Control Conference, Jun. 1994, pp. 3263-3267.

Indranil Pana, et al., "Tuning of an optimal fuzzy PID controller with stochastic algorithms for networked control systems with random time delay," ISA Transactions, vol. 50, Issue 1, Jan. 2011, pp. 28-36.

CH. Anil, et al., "Tuning of PID controllers for integrating systems using direct synthesis method," ISA Transactions, vol. 57, Jul. 2015, pp. 211-219.

Jyh-Cheng Jeng, et al., "A one-step tuning method for PID controllers with robustness specification using plant step-response data," Chemical Engineering Research & Design, vol. 92, Issue 3, Mar. 2014, pp. 545-558.

J. A. Nelder, et al., "A simplex method for function minimization," The Computer Journal, vol. 7, No. 4, Jan. 1, 1965, pp. 308-313.

M. J. D. Powell, et al., "An efficient method for finding the minimum of a function of several variables without calculating derivatives," The Computer Journal, vol. 7, No. 2, Jan. 1, 1964, pp. 155-162.

Robert Hooke, et al., ""Direct Search" Solution of Numerical and Statistical Problems," Journal of the ACM (JACM), vol. 8, Issue 2, Apr. 1961, pp. 212-229.

Ai Xiong, et al., "Application of a PID Controller using MRAC Techniques for Control of the DC Electromotor Drive," Proceedings of the 2007 IEEE, International Conference on Mechatronics and Automation, Aug. 5-8, 2007, pp. 2616-2621.

"Office Action of Taiwan Counterpart Application," dated May 16, 2016, p. 1-p. 5.

* cited by examiner

PARAMETER TUNING METHOD OF UNKNOWN PID CONTROLLER

CROSS-REFERENCE TO RELATED APPLICATION

This application claims the priority benefit of Taiwan application no. 104134585, filed on Oct. 21, 2015. The entirety of the above-mentioned patent application is hereby incorporated by reference herein and made a part of this specification.

TECHNICAL FIELD

The present disclosure relates to a controller, and more particularly, to a parameter tuning method of an unknown PID controller.

BACKGROUND

A proportional-integral-derivative (PID) controller is a common feedback loop component in industrial control applications. The PID controller is composed of a proportional unit, an integral unit and a derivative unit, and is thus capable of performing proportional, integral and/or derivative operations for error signals. Adjustments made to a proportional parameter Kp, an integral parameter Ki and a derivative parameter Kd (or adjustments made to other similar parameters) of the PID controller may be intuitively reflected on a response behavior (e.g., a response time or a steady-state error) of the system. By designing and fine-tuning the parameters Kp, Ki and Ki of the PID controller, users are able to adjust a control system to satisfy design requirements. Therefore, the PID controller is applied in industrial manufacturing processes to control basic loop (e.g., control gas pressure, fluid temperature, flow rate, liquid level, boiler combustion, etc.).

When the parameters Kp, Ki and Ki of the PID controller are adjusted improperly, the PID controller cannot reach a rated performance, resulting in poor control loop performance. Poor control loop performance can directly or indirectly affect product quality in production line and can also result in waste of energy use to thereby increase production cost. The parameter tuning method of the PID controller may be roughly divided into two categories, in which one is known as the rule based method and another one is known as the optimization algorithm based method. The rule based method has a simple tuning process, where a parameter of the PID controller may be calculated through a specific formula derived simply by substituting some known parameters (e.g., a system gain, a time constant, and a delay time) of a controlled system into a mathematic structure of the controller. The optimization algorithm based method adopts a numerical computation to find the parameter matching a specific performance specification by performing a parametric searching after adding restricted conditions (control performance specification) into a parametric model.

However, regardless of whether the rule based method or the optimization algorithm based method is adopted to perform the parameter tuning of the PID controller, it is required to know a control algorithm (e.g., a PID calculation formula being used) of the PID controller to be adjusted. The control algorithm is provided by the controller manufacturer. The PID controllers with different brands or model numbers may use different PID calculation formulas (control algorithms), and/or use different parameter definitions. The manufacturer may provide a PID parameter tuning software suitable for its own PID controller, so that the parameter of the PID controller may be calculated according to the specific performance specification. In general, when the PID parameter tuning is to be performed on basis of the optimization algorithm based method, three information items first be known of, which are: a mathematic model (system model) of a system to be controlled (target system), a calculation formula (control algorithm) of a known PID controller and a control performance specification (specific performance specification) that the user planned to achieve. According to the system model, the control algorithm (calculation formula) of the known PID controller and the specific performance specification of the design requirements, the PID parameter tuning software can perform the optimization algorithm to find an optimal parameter matching the specific performance specification.

Since different manufacturers may adopt different PID calculation formulas (control algorithms), in order to expand an applicable range of the software, developers of the PID parameter tuning software need to improve the software supportability by establishing an algorithm database corresponding to different controllers. However, the PID parameter tuning software cannot be used in cases where brand name or model number of the PID controller is unknown, or said brand name or model number are known but the controller is not supported.

SUMMARY

The present disclosure is directed a parameter tuning method of an unknown proportional-integral-derivative (PID) controller, which is capable of finding a parameter matching a specific performance specification for the unknown PID controller.

A parameter tuning method of an unknown PID controller is provided according to embodiments of the present disclosure. The parameter tuning method includes: receiving a system model of a target system, wherein the unknown PID controller correspondingly generates a control signal according to a difference between an output signal outputted by the target system and an input signal in order to control the target system, and the target system is controlled by the control signal to correspondingly generate the output signal; receiving a performance specification; according to the system model and the performance specification, performing an optimal parameter tuning by a control algorithm of a generic controller to obtain a target parameter of the generic controller; setting the unknown PID controller with a first parameter group in order to measure the input signal, the control signal and the output signal; according to the input signal, the control signal and the output signal, performing a parameter identification procedure on the generic controller to calculate a second parameter group of the generic controller; and when the second parameter group of the generic controller is not within a specification range of the target parameter of the generic controller, modifying the first parameter group for setting the unknown PID controller again, and then measuring the input signal, the control signal and the output signal again, wherein the specification range is determined by the performance specification.

Several exemplary embodiments accompanied with drawings are described in detail as follows to further describe the disclosure in details.

BRIEF DESCRIPTION OF THE DRAWINGS

The accompanying drawings are included to provide a further understanding of the disclosure, and are incorporated

DETAILED DESCRIPTION OF DISCLOSED EMBODIMENTS

Figure 1:
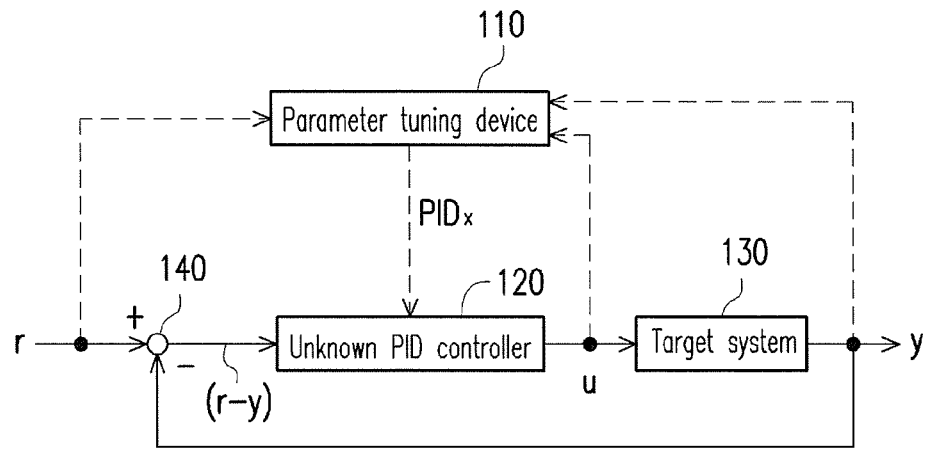
FIG. 1 is a circuit block diagram illustrating circuitry of a parameter tuning device and a proportional-integral-derivative (PID) controller according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". Moreover, wherever appropriate in the drawings and embodiments, elements/components/steps with the same reference numerals represent the same or similar parts. Elements/components/steps with the same reference numerals or names in different embodiments may be cross-referenced.

FIG. 1 is a circuit block diagram illustrating circuitry of a parameter tuning device 110 and an unknown proportional-integral-derivative (PID) controller 120 according to an embodiment of the present disclosure. The unknown PID controller 120 may be any known PID controller or unknown PID controller. In some embodiments, the unknown PID controller may be a separate product. In another embodiments, the unknown PID controller may be a function block constructed in a programmable logic controller (PLC) or a large control system. The "unknown PID controller" means that the controller may be in any form/type, but the PID calculation formulas (control algorithms) of the controller is unknown. For example, the unknown PID controller 120 may be the conventional PID controller, and thus detailed description thereof is not repeated hereinafter. A subtractor 140 calculates a difference r-y between an input signal r and an output signal y outputted by a target system 130, and provides the difference r-y to the unknown PID controller 120. The input signal r is related to a set point of the target system 130. The input signal r (the set point) is determined depending on application requirements. The unknown PID controller 120 correspondingly generates a control signal u according to the difference r-y between the input signal r and the output signal y in order to control the target system 130. The target system 130 is controlled by the control signal u to correspondingly generate the output signal y. For instance, in case the target system 130 is a factory liquid (or gas) flow rate control mechanism, the output signal r may be a set point of a flow rate, and the output signal y may represent the flow rate of the factory liquid (or gas). The unknown PID controller 120 can correspondingly generate the control signal u according to the difference r-y between the set point of the flow rate (the input signal r) and the actual flow rate (the output signal y) in order to control the factory liquid (or gas) flow rate control mechanism (the target system 130).

In some embodiments (but the present disclosure is not limited thereto), the parameter tuning device 110 may be a computer, a specific circuit for tuning parameter or other parameter tuning platforms. It should be noted that, under different application scenarios, related functions of the parameter tuning device 110 and/or the unknown PID controller 120 can be implemented in form of software, firmware or hardware by utilizing common programming languages (e.g., C or C++), hardware description languages (e.g., Verilog HDL or VHDL) or other suitable programming languages. The software (or the firmware) capable of executing the related functions can be arranged into any known computer-accessible media such as magnetic tapes, semiconductor memories, magnetic disks or compact disks (e.g., CD-ROM or DVD-ROM); or the software (or the firmware) may be transmitted via the Internet, a wired communication, a wireless communication or other communication mediums. Said software (or the firmware) can be stored in the computer-accessible media, so that a computer processor (e.g., central processing unit) can access/execute programming codes of the software (or the firmware). In addition, the device and the method of the present disclosure can also be implemented by a combination of software and hardware.

The parameter tuning device 110 can collect the input signal r, the control signal u and the output signal y, and then perform an optimal parameter tuning on the unknown PID controller 120 so as to calculate a first parameter group $PID_x$ which allows the unknown PID controller 120 to match a performance specification of the target system 130. The performance specification may be determined depending on design requirements. The first parameter group $PID_x$ may include the conventional parameters Kp, Ki and Kd of the PID controller, or include other parameters similar to the parameters Kp, Ki and Kd. The optimal parameter tuning will be described later.

Before the optimal parameter tuning may be performed by using the optimization algorithm based method, three information items first be known of, which are: a system model (mathematic model) of the target system 130, a control algorithm (calculation formula) of the unknown PID controller 120 and a performance specification determined according to the design requirements. The parameter tuning device 110 can use the optimization algorithm based method to find optimal parameter values matching the performance specification to serve as the parameter group $PID_x$. Description of the optimization algorithm based method is not repeated herein. If the control algorithm (e.g., a PID calculation formula being used) of the unknown PID controller 120 is known, the parameter tuning device 110 can use the optimization algorithm based method to perform the optimal parameter tuning, so as to calculate the parameter group $PID_x$, which allows the unknown PID controller 120 to match the performance specification of the target system 130, according to the rated performance specification. Adjustments made to the parameter group $PID_x$ of the unknown PID controller 120 may be reflected on a response behavior (e.g., a response time or a steady-state error) of the target system 130. The parameter tuning device 110 can adjust the unknown PID controller 120 by using the parameter group $PID_x$ to satisfy the design requirements. Therefore, the unknown PID controller 120 may be applied in industrial manufacturing processes to control basic loop (e.g., control gas pressure, fluid temperature, flow rate, liquid level, boiler combustion, etc.).

Figure 2:
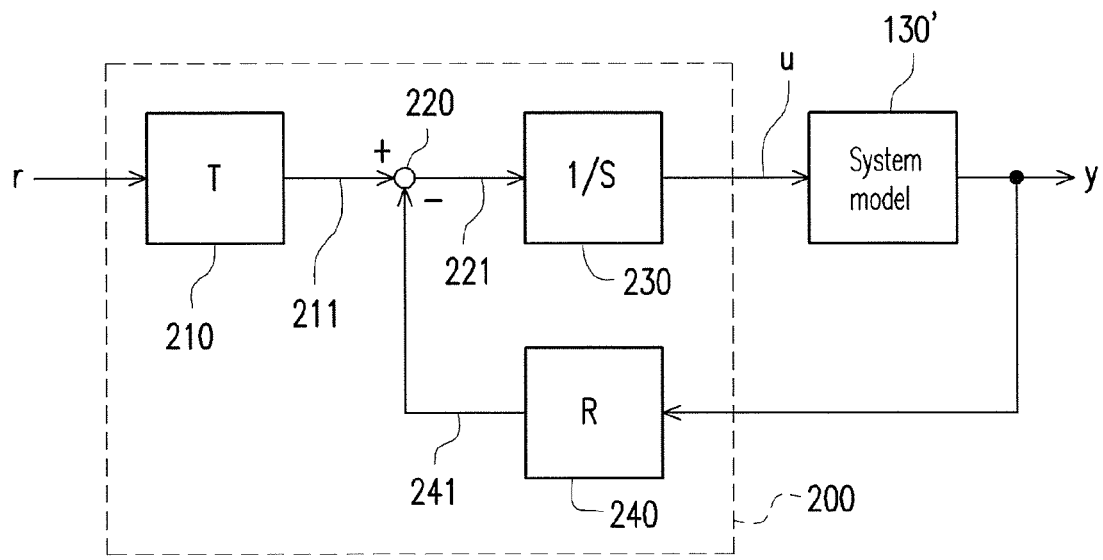
FIG. 2 is a schematic diagram illustrating structure of a control algorithm (calculation formula) of a generic controller according to an embodiment of the present disclosure.

If the control algorithm (e.g., the PID calculation formula being used) of the unknown PID controller 120 is unknown, the parameter tuning device 110 cannot use the optimization algorithm based method to perform the optimal parameter tuning on the unknown PID controller 120. In this case, the parameter tuning device 110 can use a control algorithm of a generic controller to replace the control algorithm of the unknown PID controller 120. The generic controller may be regarded as a versatile control structure which is compatible with different PID controller types. FIG. 2 is a schematic diagram illustrating structure of a control algorithm (calculation formula) of a generic controller 200 according to an embodiment of the present disclosure. The parameter tuning device 110 can use the control algorithm of the generic controller 200 to replace the control algorithm of the unknown PID controller 120 in order to perform the optimal parameter tuning (e.g., perform the optimization algorithm based method). The control algorithm of the generic controller 200 includes an input unit 210, a subtractor 220, a control unit 230 and a feedback unit 240. The input unit 210 receives and processes the input signal r to obtain a first corresponding value 211. The feedback unit 240 receives and processes the output signal y to obtain a second corresponding value 241. The subtractor 220 calculates a difference 221 between the first corresponding value 211 and the second corresponding value 241. The control unit 230 receives and processes the difference 221 to obtain the control signal u, and outputs the control signal u to a system model (mathematic model) 130' of the target system 130. For example, the input unit 210 can process the input signal r to obtain the first corresponding value 211 by using a polynomial function $$T(z^{-1}) = \sum_{i=0} T_i z^{-i} = T_0 + T_1 z^{-1} + T_2 z^{-2} + \ldots$$

of the z domain. The feedback unit 240 can process the output signal y to obtain the second corresponding value 241 by using a polynomial function $$R(z^{-1}) = \sum_{i=0} R_i z^{-i} = R_0 + R_1 z^{-1} + R_2 z^{-2} + \ldots$$

of the z domain. The control unit 230 processes the difference 221 to obtain the control signal u by using a polynomial function $$1/S(z^{-1}) = 1 \bigg/ \sum_{i=0} S_i z^{-i} = 1/(S_0 + S_1 z^{-1} + S_2 z^{-2} + \ldots)$$

of the z domain.

The generic controller 200 may be regarded as a versatile control structure which is compatible with different PID controller types. For instance, the typical PID control algorithm may be expressed as $C(s)=K+1/(sT_i)+sT_d$ in continuous time (the s domain), where K, $T_i$ and $T_d$ are real numbers. Herein, the continuous time (the s domain) is converted into a discrete time (the z domain) form. $C(s)=K+1/(sT_i)+sT_d$ is converted into $C(z^{-1})=K+T_s/[T_i(1-z^{-1})]+[T_d(1-z^{-1})]/T_s$, where $T_s$ is a real number. $C(z^{-1})$ may be arranged to be expressed as $R(z^{-1})=R_0+R_1Z^{-1}+R_2Z^{-2}$, $1/S(z^{-1})=1/(S_0+S_1Z^{-1})$ and $T(z^{-1})=T_0+T_1Z^{-1}+T_2Z^{-2}$ by using the control algorithm (calculation formula) of the generic controller 200, where $R_0=T_0=K+(T_s/T_i)+(T_d/T_s)$, $R_1=T_1=-K-(2T_d/T_s)$, $R_2=T_2=(T_d/T_s)$ and $S_0=1$, $S_1=-1$. In view of above simple example, a PID controller in a particular form may be considered as one particular case of the generic controller 200.

Figure 3:
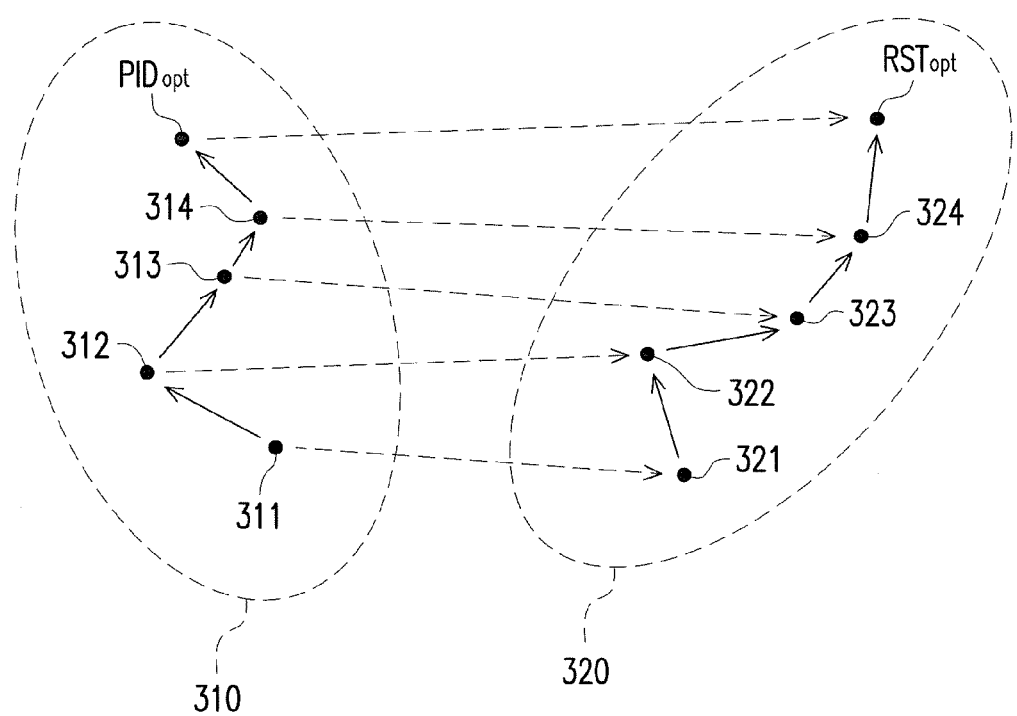
FIG. 3 is a schematic diagram illustrating a mapping relationship between the parameter space of the unknown PID controller depicted in FIG. 1 and the parameter space of the generic controller depicted in FIG. 2 according to an embodiment of the present disclosure.

The unknown PID controller 120 considered as one particular case of the generic controller 200 means that a mapping relationship exists between a parameter space of the unknown PID controller 120 and a parameter space of the generic controller 200. FIG. 3 is a schematic diagram illustrating a mapping relationship between the parameter space of the unknown PID controller 120 depicted in FIG. 1 and the parameter space of the generic controller 200 depicted in FIG. 2 according to an embodiment of the present disclosure. The parameter space of the unknown PID controller 120 depicted in FIG. 1 is represented by a parameter space 310, and the parameter space of the generic controller 200 depicted in FIG. 2 is represented by a parameter space 320. Setting the unknown PID controller 120 with a parameter group 311 in the parameter space 310 as the parameter group $PID_x$ is equivalent to setting the generic controller 200 with a parameter group 321 in the parameter space 320. In other words, the unknown PID controller 120 and the generic controller 200 will have the equivalent control performance at the time. By analogy, a parameter group 312 in the parameter space 310 may be mapped to a parameter group 322 in the parameter space 320; a parameter group 313 in the parameter space 310 may be mapped to a parameter group 323 in the parameter space 320; and a parameter group 314 in the parameter space 310 may be mapped to a parameter group 324 in the parameter space 320.

Herein, the parameter tuning device 110 can use the optimization algorithm based method to perform the optimal parameter tuning on the generic controller 200, so as to find the optimal parameter values matching the performance specification to serve as a target parameter $RST_{opt}$. Description of the optimization algorithm based method is not repeated herein. Based on the mapping relationship between the parameter space 310 and the parameter space 320, the parameter space 310 of the unknown PID controller 120 includes a target parameter $PID_{opt}$ matching the performance specification. As described above, in case the control algorithm (e.g., the PID calculation formula being used) of the unknown PID controller 120 is unknown, the parameter tuning device 110 cannot use the optimization algorithm based method to perform the optimal parameter tuning on the unknown PID controller 120 to find the target parameter $PID_{opt}$. Nonetheless, the parameter tuning device 110 may find the first parameter group $PID_x$ approaching to the target parameter $PID_{opt}$ by using the mapping relationship between the parameter space 310 and the parameter space 320 depicted in FIG. 3, so that the unknown PID controller 120 can match the specific performance specification. For instance, the parameter tuning device 110 can sequentially adjust the first parameter group $PID_x$ of the unknown PID controller 120 based on a calculation process of a direct search method (e.g., sequentially selecting the parameter groups 311, 312, 313 and 314 in the parameter space 310 depicted in FIG. 3 to serve as the first parameter group $PID_x$). Theoretically, when the parameter values of the parameter space 320 that mapped to the parameter values (the first parameter group $PID_x$) of the parameter space 310 reach the target parameter $RST_{opt}$ of the generic controller 200, the first parameter group $PID_x$ is the target parameter $PID_{opt}$.

The implementation of the direct search method is not particularly limited by the present embodiment. For instance, the direct search method may be a Powell method (M. J. D. Powell, "An efficient method for finding the minimum of a function of several variables without calculating derivatives," 1964), a Nelder and Mead method (John A. Nelder & R. Mead, "A simplex method for function minimization," 1965) or a Hooke and Jeeves method (R. Hooke & T. A. Jeeves, ""Direct search" solution of numerical and statistical problems," 1961). The Powell method, the Nelder and Mead method and the Hooke and Jeeves method belong to the conventional art, and thus related descriptions are not repeated hereinafter.

Figure 4:
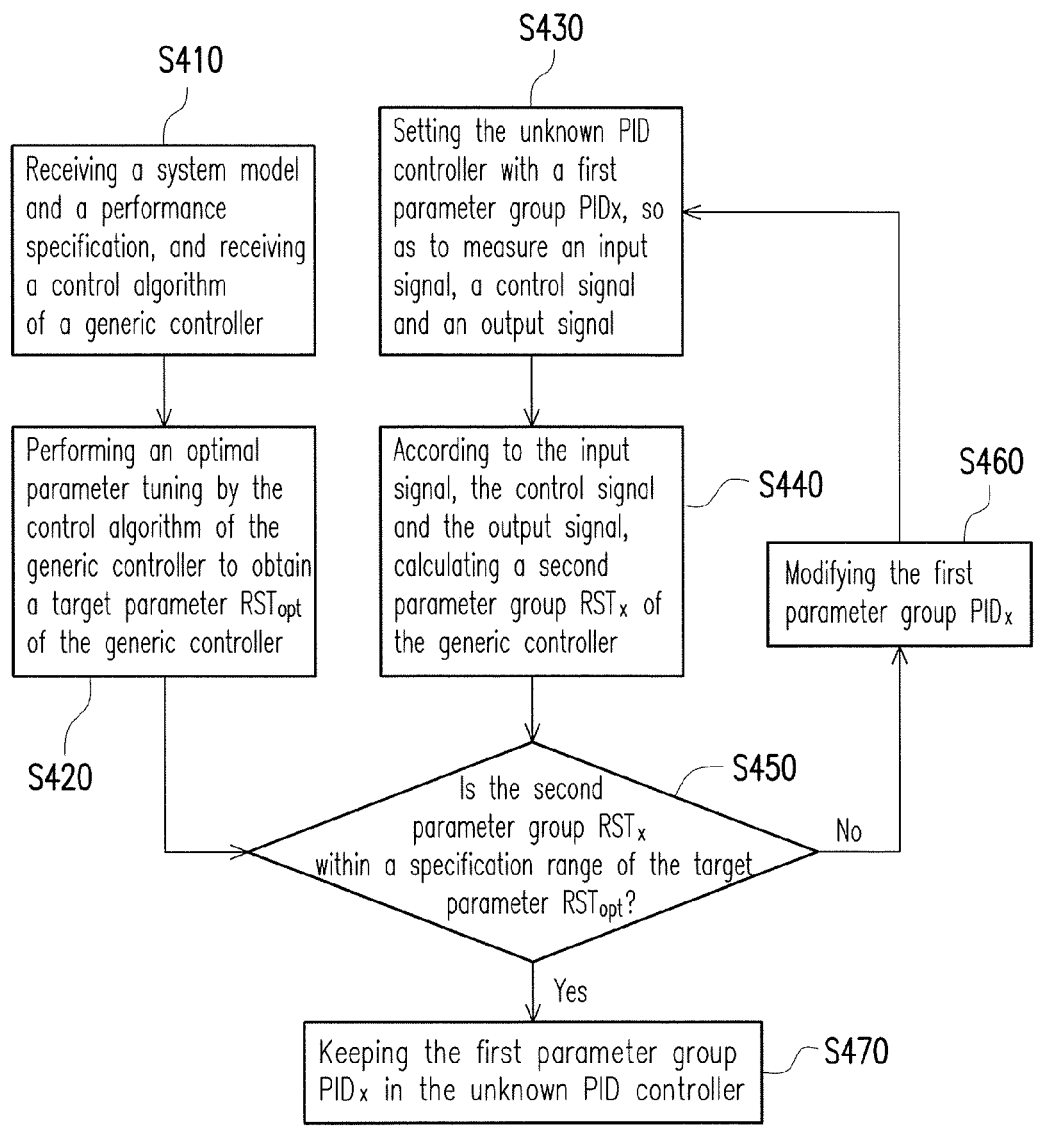
FIG. 4 is a flowchart illustrating a parameter tuning method of an unknown PID controller according to an embodiment of the present disclosure.

FIG. 4 is a flowchart illustrating a parameter tuning method of an unknown PID controller according to an embodiment of the present disclosure. The parameter tuning device 110 depicted in FIG. 1 may be used to perform the parameter tuning method depicted in FIG. 4. In step S410, the parameter tuning device 110 receives a system model of the target system 130, a control algorithm of the generic controller 200 and a performance specification determined according to the design requirements. In step S420, according to the system model of the target system 130 and the rated performance specification, the parameter tuning device 110 can perform an optimal parameter tuning by replacing a control algorithm of the unknown PID controller 120 with the control algorithm of the generic controller 200, so as to obtain a target parameter $RST_{opt}$ of the generic controller 200. Herein, the performance specification can determine a specification range of the target parameter $RST_{opt}$. That is to say, when the parameter of the generic controller 200 falls within the specification range, the generic controller 200 is bounded to match the performance specification. In some embodiments (but the present disclosure is not limited thereto), the parameter tuning device 110 can obtain the target parameter $RST_{opt}$ of the generic controller 200 by using the optimization algorithm based method to perform the optimal parameter tuning with the control algorithm of the generic controller 200 in step S420.

In step S430, the parameter tuning device 110 can set the unknown PID controller 120 with a first parameter group $PID_x$, so as to measure/collect an input signal r and a control signal u of the unknown PID controller 120, and measure/collect an output signal y of the target system 130 through a sensor (not shown). An initial value of the first parameter group $PID_x$ may be a regular operation value (e.g., the parameter group 311) in the parameter space 310. In step S440, the parameter tuning device 110 can perform the parameter identification procedure on the generic controller 200 according to the input signal r, the control signal u and the output signal y measured in step S430, so as to calculate a second parameter group $RST_x$ of the generic controller 200. For instance, when the first parameter group $PID_x$ of the unknown PID controller 120 is the parameter group 311 in the parameter space 310 depicted in FIG. 3, the parameter tuning device 110 can perform the parameter identification procedure to calculate the parameter group 321 in the parameter space 320 depicted in FIG. 3 to serve as the second parameter group $RST_x$ of the generic controller 200.

The implementation of the parameter identification procedure is not particularly limited by the present embodiment. For instance, the parameter identification procedure may use an instrumental variable method (IV method) or a least squares method to calculate the second parameter group $RST_x$ of the generic controller 200. The instrumental variable method and the least squares method belong to the conventional art, and thus related descriptions are not repeated hereinafter.

In step S450, the parameter tuning device 110 can check whether the current parameter group (the second parameter group $RST_x$) of the generic controller 200 is within a specification range (the specification range may be determined by the performance specification) of the target parameter $RST_{opt}$ of the generic controller 200. When the second parameter group $RST_x$ of the generic controller 200 is not within the specification range of the target parameter $RST_{opt}$ (which indicates that the generic controller 200 does not match the performance specification at the time), the parameter tuning device 110 proceeds to perform step S460.

The parameter tuning device 110 can modify the first parameter group $PID_x$ for setting the unknown PID controller 120 again (step S460), and then the parameter tuning device 110 can measure the input signal r, the control signal u and the output signal y again (step S430). For instance, the parameter tuning device 110 can change the first parameter group $PID_x$ from the parameter group 311 in the parameter space 310 depicted in FIG. 3 into the parameter group 312. Then, the parameter tuning device 110 can perform step S430 to step S450 again, so as to set the unknown PID controller 120 with the new parameter group 312 in the parameter space 310 depicted in FIG. 3, and find the new parameter group $RST_x$ (e.g., the parameter group 322 in the parameter space 320 depicted in FIG. 3) of the generic controller 200 according to the input signal r, the new control signal u and the new output signal y. By analogy, the parameter tuning device 110 can use the direct search method to calculate a new value of the first parameter group $PID_x$ by, for example, changing the first parameter group $PID_x$ from the parameter group 312 in the parameter space 310 into the parameter group 313, or from the parameter group 313 into the parameter group 314, or from the parameter group 314 into the parameter group $PID_{opt}$. During the process of modifying the first parameter group $PID_x$, the parameter tuning device 110 can find the corresponding second parameter group $RST_x$ (e.g., 323, 324 and $RST_{opt}$ in the parameter space 320 depicted in FIG. 3) in the generic controller 200.

The process of adjusting the first parameter group $PID_x$ may be considered as a process of minimizing the difference between its mapping point in the parameter space 320 and an optimal parameter point (the target parameter $RST_{opt}$), which can be expressed by an equation as:

$$PID_{opt} = \underset{PID_x}{\operatorname{argmin}} |RST_{opt} - RST_x|.$$

The parameter tuning device 110 can use the direct search method (e.g., the method proposed by Nelder and Mead (1965), but the present disclosure is not limited thereto) to perform a parametric searching. After setting the unknown PID controller 120 with an initial point (the parameter group 311 in the parameter space 310), the parameter tuning device 110 can calculate the corresponding parameter group 321 in the parameter space 320 to serve as the second parameter group $RST_x$ by the parameter identification procedure. The parameter tuning device 110 can calculate a difference between the parameter group 321 in the parameter space 320 and the target parameter $RST_{opt}$, so as to determine the new first parameter group $PID_x$ to be the parameter group 312 in the parameter space 310 according to the direct search method. After setting the unknown PID controller 120 with the parameter group 312, the parameter tuning device 110 can calculate the corresponding parameter group 322 in the parameter space 320 to serve as the second parameter group $RST_x$ by the parameter identification procedure. The parameter tuning device 110 can calculate a difference between the parameter group 322 in the parameter space 320 and the target parameter $RST_{opt}$, so as to determine the new first parameter group $PID_x$ to be the parameter group 313 in the parameter space 310 according to the direct search method. By analogy, the search is stopped when the mapping point (the second parameter group $RST_x$) of the first parameter group $PID_x$ in the parameter space 320 approaches or reaches the target parameter $RST_{opt}$. At this time, the first parameter group $PID_x$ approaches or reaches the target parameter $PID_{opt}$. In some other embodiments, although it is still possible that the second parameter group $RST_x$ has not yet reached the target parameter $RST_{opt}$, the parameter tuning device 110 can stop the search in advance if the first parameter group $PID_x$ can satisfy the set performance requirements during the process.

When determining that the second parameter group $RST_x$ of the generic controller 200 is within the specification range of the target parameter $RST_{opt}$ of the generic controller 200 in step S450, it indicates that the unknown PID controller 120 set with the first parameter group $PID_x$ satisfies the performance specification, and thus the first parameter group $PID_x$ is kept in the unknown PID controller 120 without further changing (step S470).

Figure 5:
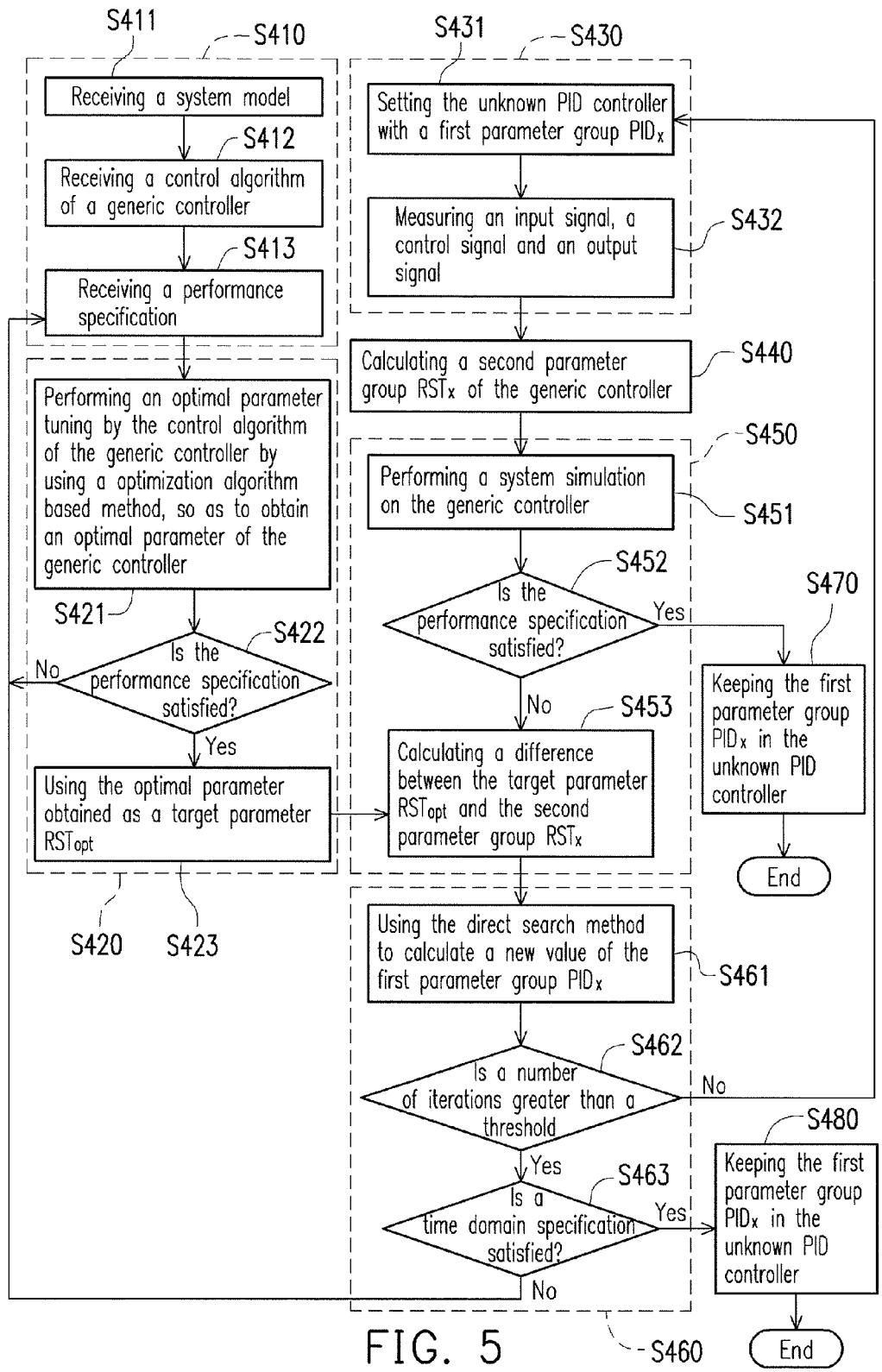
FIG. 5 is a flowchart illustrating a parameter tuning method of an unknown PID controller according to another embodiment of the present disclosure.

FIG. 5 is a flowchart illustrating a parameter tuning method of an unknown PID controller according to another embodiment of the present disclosure. The parameter tuning device 110 depicted in FIG. 1 may be used to perform the parameter tuning method depicted in FIG. 5. Step S410 to step S470 depicted in FIG. 5 may refer to related descriptions of step S410 to step S470 depicted in FIG. 4. In the embodiment depicted in FIG. 5, the parameter tuning method may be divided mainly into two stages. The first stage is an optimization design stage for the generic controller 200. The second stage is an actual mapping stage for the parameter of the unknown PID controller 120 and the parameter of the generic controller 200. Steps S410 and S420 depicted in FIG. 5 are processes of the first stage, whereas steps S430, S440, S450, S460, S470 and S480 depicted in FIG. 5 are processes of the second stage. In the second stage, the first parameter group HD, of the unknown PID controller 120 is sequentially adjusted, so that the mapping value thereof (the second parameter group $RST_x$) in the parameter space 320 of the generic controller 200 can approach or reach the target parameter $RST_{opt}$.

Step S410 includes sub steps S411, S412 and S413. In step S411, the parameter tuning device 110 receives a system model of the target system 130. If the system model of the target system 130 is unknown, the parameter tuning device 110 can first collect loop data (i.e., the input signal r, the control signal u and the output signal y) for performing a system parameter identification in order to obtain the system model of the target system 130. For example, the parameter device 110 can obtain the system model of the target system 130 by performing the instrumental variable method or the least square method, which are not repeated hereinafter. In step S411, orders of the system model of the target system 130 are further determined. In step S411, the orders of the system model of the target system 130 may be determined by calculating a Akaike information criteria (AIC), a Bayesian information criteria (BIC) or other criteria.

In step S412, the parameter tuning device 110 receives a control algorithm of the generic controller 200. In the step S412, orders of the control algorithm of the generic controller 200 are also determined. In step S412, the orders of the control algorithm of the generic controller 200 may be determined by calculating the Akaike information criteria (AIC), the Bayesian information criteria (BIC) or other criteria. Alternatively, the orders of the control algorithm of the generic controller 200 may be determined according to the design requirements by, for example, setting the orders of the control algorithm of the generic controller 200 to be 2 or 3. In step S413, the parameter tuning device 110 receives a performance specification determined according to the design requirements to serve as the restricted conditions of the parameter tuning method.

Step S420 includes sub steps S421, S422 and S423. In step S421, according to the system model of the target system 130 and the rated performance specification, the parameter tuning device 110 can perform an optimal parameter tuning by the control algorithm of the generic controller 200, so as to obtain an optimal parameter of the generic controller 200. For instance, the parameter tuning device 110 can calculate the optimal parameter matching the performance specification by using the optimization algorithm based method. In step S422, the parameter tuning device 110 can perform a system simulation on the generic controller 200, so as to check whether the generic controller 200 satisfies/matches the performance specification. If the generic controller 200 using the optimal parameter does not match the performance specification, the parameter tuning device 110 can return back to step S413, so that the user may re-adjust a design specification (the performance specification). If the generic controller 200 using the optimal parameter matches the performance specification, the optimal parameter obtained in step S421 may be used as the target parameter $RST_{opt}$ of the generic controller 200 (step S423).

Step S430 includes sub steps S431 and S432. In step S431, the parameter tuning device 110 can use the first parameter group $PID_x$ to set the unknown PID controller 120. An initial value of the first parameter group $PID_x$ may be a regular operation parameter value (e.g., the parameter 311) in the parameter space 310. In step S432, the parameter tuning device 110 can measure/collect the input signal r and the control signal u of the unknown PID controller 120, and measure/collect the output signal y of the target system 130.

In step S440, the parameter tuning device 110 can perform the parameter identification procedure on the generic controller 200 according to the input signal r, the control signal u and the output signal y measured in step S432, so as to calculate the second parameter group $RST_x$ of the generic controller 200. For instance, when the first parameter group $PID_x$ of the unknown PID controller 120 is the parameter group 311 in the parameter space 310 depicted in FIG. 3, the parameter tuning device 110 can perform the parameter identification procedure to calculate the parameter group 321 in the parameter space 320 depicted in FIG. 3 to serve as the second parameter group $RST_x$ of the generic controller 200. The implementation of the parameter identification procedure is not particularly limited by the present embodiment. For instance, the parameter identification procedure may use the instrumental variable method or the least square method, which are not repeated hereinafter.

Step S450 includes sub steps S451, S452 and S453, and step S460 includes sub steps S461, S462 and S463. The parameter tuning device 110 can substitute the second parameter group $RST_x$ obtained in step S440 into the generic controller 200 for performing a system simulation (step S451), so as to check whether the second parameter group $RST_x$ can satisfy the design specification (the performance specification) (step S452). If the generic controller 200 set with the second parameter group $RST_x$ satisfies the design specification (the performance specification), it indicates that the unknown PID controller 120 set with the first parameter group $PID_x$ also satisfies the performance specification, and thus the current first parameter group $PID_x$ is kept in the unknown PID controller 120 without further changing (step S470). If the generic controller 200 set with the second parameter group $RST_x$ does not satisfy the design specification (the performance specification), proceeding to step S453.

In step S453, the parameter tuning device 110 can calculate a difference between the second parameter group $RST_x$ in the parameter space 320 and the target parameter $RST_{opt}$ by, for example, calculating a difference norm between the target parameter $RST_{opt}$ and the second parameter $RST_x$. In step S461, the parameter tuning device 110 can use the direct search method to calculate the next first parameter group $PID_x$. Said direct search method may be the Powell method, the Nelder and Mead method or the Hooke and Jeeves method, which are not repeated hereinafter. In step S462, the parameter tuning device 110 can check whether a number of iterations of the direct search method is greater than a threshold. The threshold may be determined according to the design requirements. If the number of the iterations does not reach the threshold, returning back to step S431, in which the unknown PID controller 120 is set with the new first parameter group $PID_x$ obtained in step S461. By analogy, the parameter identification procedure of step S440 and the direct search method of step S461 are performed continuously to re-calculate the new second parameter group $RST_x$ and the new first parameter group $PID_x$, and the iterations are stopped when determining that the second parameter group $RST_x$ of the generic controller 200 is within the specification range of the target parameter $RST_{opt}$ of the generic controller 200 (i.e., the second parameter group $RST_x$ satisfies the performance specification) in step S452. If it is determined that the number of the iterations has reached the threshold but the second parameter group $RST_x$ matching all the performance specification can still not be found in step S462, proceeding to step S463.

In step S463, the parameter tuning device 110 can check whether the generic controller 200 set with the second parameter group $RST_x$ matches a main time domain specification in the design specification (the performance specification). According to the design requirements, said time domain specification may include a rising time, an over shoot, a settling time or other time domain specification. If the generic controller 200 set with the second parameter group $RST_x$ matches the time domain specification, the iterations are stopped and the current first parameter group $PID_x$ is kept in the unknown PID controller 120 without further changing (step S480). If the generic controller 200 set with the second parameter group $RST_x$ does not match the time domain specification, returning back to step S413, in which the user may re-examine and re-adjust the design specification (the performance specification). After re-adjusting the performance specification, the parameter tuning device 110 can perform steps S420, S430, S440, S450 and/or S460 again, so as to search the first parameter group $PID_x$ matching the design specification (the performance specification) again.

Figure 6:
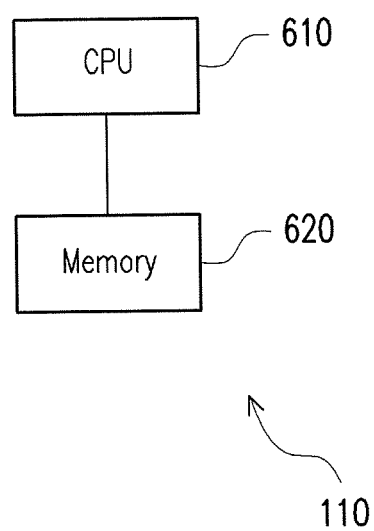
FIG. 6 is a circuit block diagram of a parameter tuning device depicted in FIG. 1 according to an embodiment of the present disclosure.

FIG. 6 is a circuit block diagram of a parameter tuning device 110 depicted in FIG. 1 according to an embodiment of the present disclosure. The descriptions related to FIG. 6 may be reference to the descriptions related to FIG. 1 to FIG. 5, and/or the descriptions related to FIG. 1 to FIG. 5 may be reference to the descriptions related to FIG. 6. In FIG. 1 and FIG. 6, the parameter tuning device 110 is configured to tune parameter of the unknown PID controller 120. The unknown PID controller 120 correspondingly generates the control signal u according to a difference between the output signal y outputted by the target system 130 and the input signal r in order to control the target system 130. The target system 130 is controlled by the control signal u to correspondingly generate the output signal y.

The parameter tuning device 110 comprises a central processing unit (CPU) 610 and a memory 620. The memory 620 is coupled to the CPU 610. The memory 620 is configured to store a plurality of programming codes. The CPU 610 can access the memory 620 and execute the programming codes, so as to receive a system model of the target system 130, receive a performance specification, and perform an optimal parameter tuning by a control algorithm of the generic controller 200 to obtain a target parameter $RST_{opt}$ of the generic controller 200 according to the system model and the performance specification. The CPU 610 can execute the programming codes of the memory 620 to set the unknown PID controller 120 with a first parameter group $PID_x$ in order to measure the input signal r, the control signal u and the output signal y. The CPU 610 can execute the programming codes of the memory 620 to perform a parameter identification procedure on the generic controller 200 to calculate a second parameter group $RST_x$ of the generic controller 200 according to the input signal r, the control signal u and the output signal y. When the second parameter group $RST_x$ of the generic controller 200 is not within a specification range of the target parameter $RST_{opt}$ of the generic controller 200, the CPU 610 can execute the programming codes of the memory 620 to modify the first parameter group $PID_x$ for setting the unknown PID controller 120 again, and then measure the input signal r, the control signal u and the output signal y again, wherein the specification range is determined by the performance specification.

In summary, the parameter tuning method of the unknown PID controller 120 provided according to the foregoing embodiments can replace the generic controller 200 by the unknown PID controller 120 to perform the optimal parameter tuning (e.g., by performing the optimization algorithm based method) so as to obtain the target parameter (e.g., the optimal parameter) matching the design specification (the performance specification). A mapping relationship exists between the parameter space 310 of the unknown PID controller 120 and the parameter space 320 of the generic controller 200. The corresponding parameter (the second parameter group $RST_x$) of the generic controller 200 may be found by modifying the parameter (the first parameter group $PID_x$) of the unknown PID controller 120. When the second parameter group $RST_x$ of the generic controller 200 is within the specification range of the target parameter $RST_{opt}$ of the generic controller 200, the first parameter group $PID_x$ of the unknown PID controller can match the performance specification. Accordingly, the parameter tuning method of the unknown PID controller as disclosed according to embodiments of the present disclosure is capable of finding the parameter matching the specific performance specification for the unknown PID controller.

Based on the above, the parameter tuning method of the unknown PID controller is provided according to the embodiments of the present disclosure. The parameter tuning method can replace the unknown PID controller with a generic controller to perform the optimal parameter tuning in order to obtain the target parameter (e.g., an optimal parameter). A mapping relationship exists between a parameter space of the unknown PID controller and a parameter space of the generic controller. By modifying the parameter (the first parameter group) of the PID controller, the corresponding parameter (the second parameter group) of the generic controller may be found by using the parameter identification procedure. When the second parameter group of the generic controller is within the specification range of the target parameter of the generic controller, the first parameter group of the unknown PID controller can match the performance specification. Accordingly, the parameter tuning method of the unknown PID controller as disclosed according to embodiments of the present disclosure is capable of finding the parameter matching the specific performance specification for the unknown PID controller.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A parameter tuning method of an unknown proportional-integral-derivative (PID) controller which has an unknown manufacturer which provides a control algorithm to support the PID controller, comprising:
   receiving a system model of a target system by a parameter tuning device, wherein the unknown PID controller correspondingly generates a control signal according to a difference between an output signal outputted by the target system and an input signal in order to control the target system, and the target system is controlled by the control signal to correspondingly generate the output signal;
   receiving a performance specification by the parameter tuning device;
   performing, by the parameter tuning device, an optimal parameter tuning by a control algorithm of a generic controller to obtain a target parameter of the generic controller according to the system model and the performance specification;
   setting the unknown PID controller with a first parameter group in order to measure the input signal, the control signal and the output signal;
   performing, by the parameter tuning device, a parameter identification procedure on the generic controller to calculate a second parameter group of the generic controller according to the input signal, the control signal and the output signal; and
   when the second parameter group of the generic controller is not within a specification range of the target parameter of the generic controller, modifying the first parameter group for setting the unknown PID controller again, and then measuring the input signal, the control signal and the output signal again, wherein the specification range is determined by the performance specification.

2. The parameter tuning method of the unknown PID controller according to claim 1, further comprising:
   when the second parameter group of the generic controller is within the specification range of the target parameter of the generic controller, keeping the first parameter group in the unknown PID controller.

3. The parameter tuning method of the unknown PID controller according to claim 1, wherein the control algorithm of the generic controller comprises an input unit, a subtractor, a control unit and a feedback unit, the input unit receives and processes the input signal to obtain a first corresponding value, the feedback unit receives and processes the output signal to obtain a second corresponding value, the subtractor calculates a difference between the first corresponding value and the second corresponding value, and the control unit receives and processes the difference to obtain the control signal.

4. The parameter tuning method of the unknown PID controller according to claim 3, wherein the input unit processes the input signal to obtain the first corresponding value by using a polynomial function $$T(z^{-1}) = \sum_{i=0} T_i z^{-i},$$

the feedback unit processes the output signal to obtain the second corresponding value by using a polynomial function $$R(z^{-1}) = \sum_{i=0} R_i z^{-i},$$

and the control unit processes the difference to obtain the control signal by using a polynomial function $$1/S(z^{-1}) = 1 \Big/ \sum_{i=0} S_i z^{-i}.$$

5. The parameter tuning method of the unknown PID controller according to claim 3, wherein the input unit processes the input signal to obtain the first corresponding value by using a polynomial function $T(z^{-1})=T_0+T_1 z^{-1}+T_2 z^{-2}$, the feedback unit processes the output signal to obtain the second corresponding value by using a polynomial function $R(z^{-1})=R_0+R_1 z^{-1}+R_2 z^{-2}$, and the control unit processes the difference to obtain the control signal by using a polynomial function $1/S(z^{-1})=1/(S_0+S_1 z^{-1})$.

6. The parameter tuning method of the unknown PID controller according to claim 1, wherein the step of performing the optimal parameter tuning by the control algorithm of the generic controller comprises:
   determining orders of the control algorithm of the generic controller, and
   performing the optimal parameter tuning by the control algorithm of the generic controller to obtain the target parameter of the generic controller.

7. The parameter tuning method of the unknown PID controller according to claim 6, wherein the step of determining the orders of the control algorithm of the generic controller comprises:

determining the orders of the control algorithm of the generic controller by calculating a Akaike information criteria or a Bayesian information criteria.

8. The parameter tuning method of the unknown PID controller according to claim 1, wherein the parameter identification procedure comprises:

calculating the second parameter group of the generic controller by using an instrumental variable method or a least squares method.

9. The parameter tuning method of the unknown PID controller according to claim 1, wherein the step of modifying the first parameter group for setting the unknown PID controller again comprises:

calculating a new value of the first parameter group by using a direct search method according to a difference between the second parameter group of the generic controller and the target parameter of the generic controller.

10. The parameter tuning method of the unknown PID controller according to claim 9, wherein the direct search method comprises a Powell method, a Nelder and Mead method or a Hooke and Jeeves method.

11. The parameter tuning method of the unknown PID controller according to claim 9, wherein the step of modifying the first parameter group for setting the unknown PID controller again further comprises:

checking whether a number of iterations of the direct search method is greater than a threshold;

if the number of the iterations does not reach the threshold, setting the unknown PID controller with the new value of the first parameter group; and if the number of the iterations reaches the threshold, stopping the iterations.

12. The parameter tuning method of the unknown PID controller according to claim 11, wherein the step of modifying the first parameter group for setting the unknown PID controller again further comprises:

after the iterations of the direct search method are stopped, checking whether the generic controller set with the second parameter group matches a time domain specification in the performance specification; and if the generic controller set with the second parameter group matches the time domain specification, keeping the first parameter group in the unknown PID controller.

13. The parameter tuning method of the unknown PID controller according to claim 12, wherein the step of modifying the first parameter group for setting the unknown PID controller again further comprises:

if the generic controller set with the second parameter group does not match the time domain specification, adjusting the performance specification.

14. A parameter tuning device, configured for tuning parameter of an unknown proportional-integral-derivative (PID) controller which has an unknown manufacturer which provides a control algorithm to support the PID controller, wherein the unknown PID controller correspondingly generates a control signal according to a difference between an output signal outputted by a target system and an input signal in order to control the target system and the target system is controlled by the control signal to correspondingly generate the output signal, the parameter tuning device comprising:

a central processing unit (CPU); and a memory, coupled to the CPU, configured to store a plurality of programming codes, wherein the CPU execute the programming codes for receiving a system model of the target system, receiving a performance specification, performing an optimal parameter tuning by a control algorithm of a generic controller to obtain a target parameter of the generic controller according to the system model and the performance specification, setting the unknown PID controller with a first parameter group in order to measure the input signal, the control signal and the output signal, performing a parameter identification procedure on the generic controller to calculate a second parameter group of the generic controller according to the input signal, the control signal and the output signal, and when the second parameter group of the generic controller is not within a specification range of the target parameter of the generic controller, modifying the first parameter group for setting the unknown PID controller again, and then measuring the input signal, the control signal and the output signal again, wherein the specification range is determined by the performance specification.

* * * * *